Dec. 8, 1942.　　　E. R. KNOWLES　　　2,304,461
INJECTION MOLDING APPARATUS
Filed Dec. 4, 1940　　　2 Sheets-Sheet 1
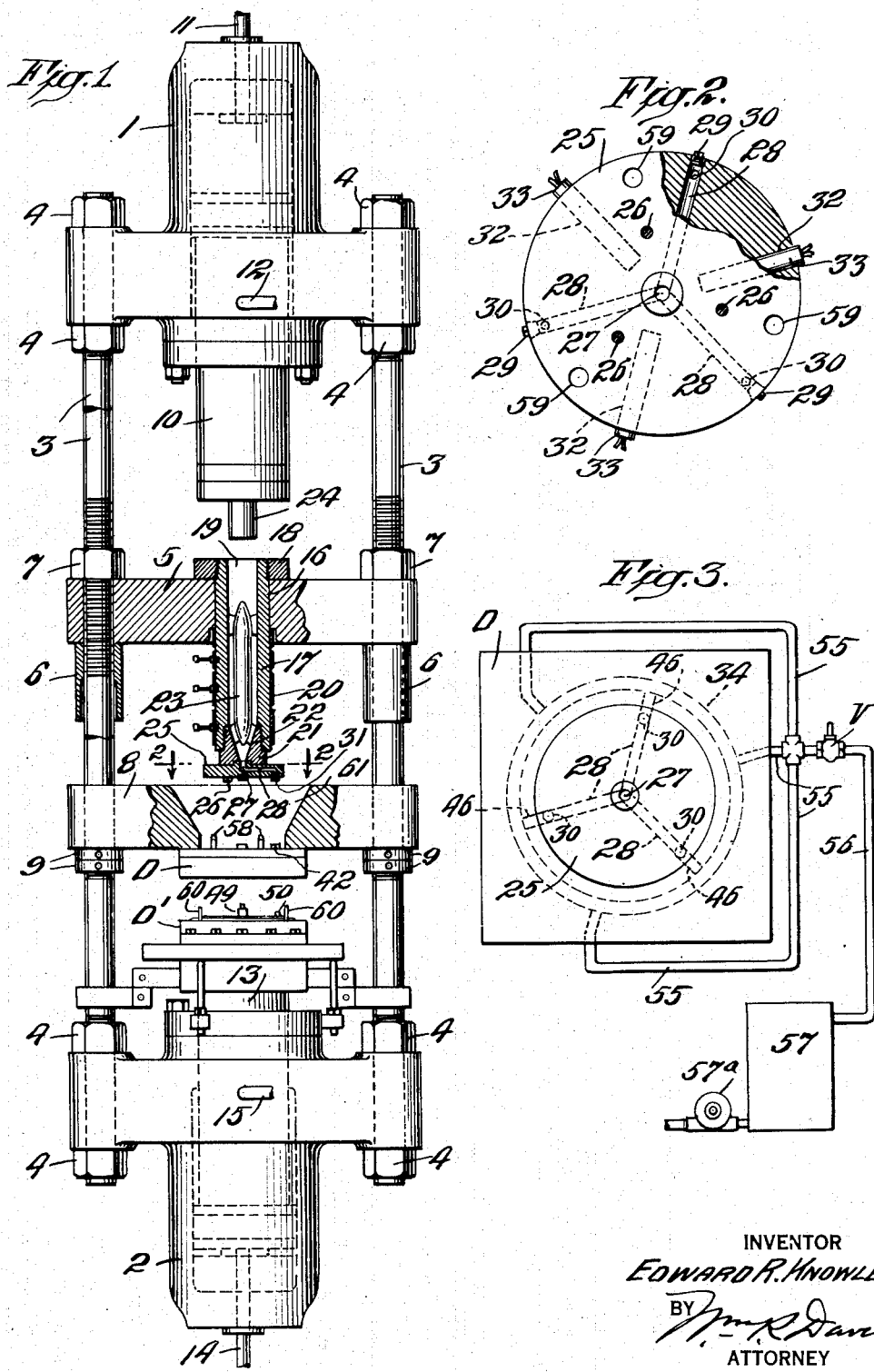
INVENTOR
EDWARD R. KNOWLES
BY
ATTORNEY Dec. 8, 1942.     E. R. KNOWLES     2,304,461
INJECTION MOLDING APPARATUS
Filed Dec. 4, 1940     2 Sheets-Sheet 2
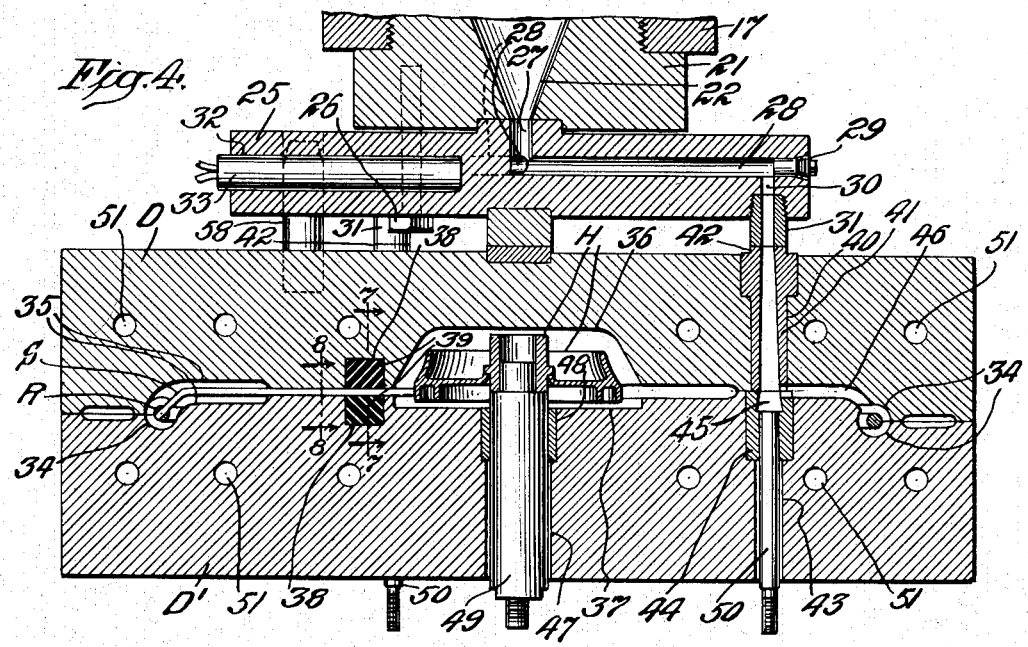
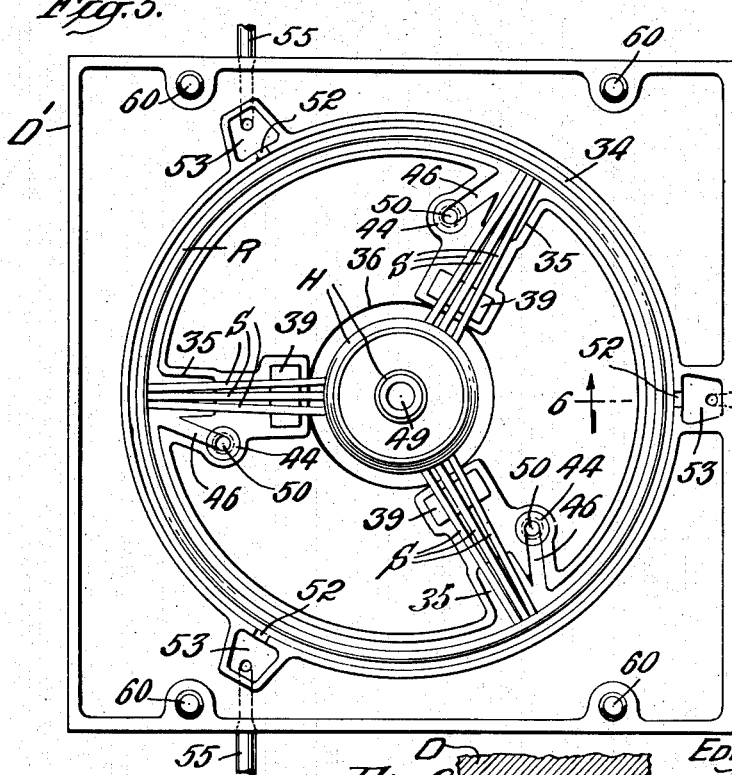
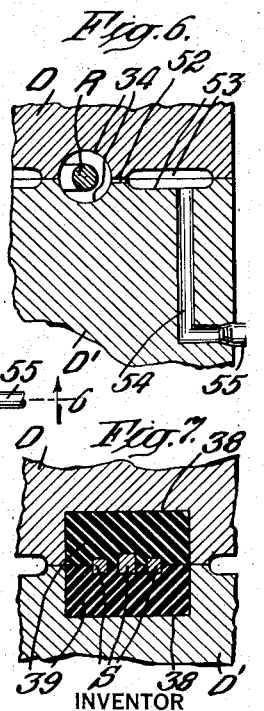
INVENTOR
Edward R. Knowles
BY
ATTORNEY Patented Dec. 8, 1942

2,304,461

UNITED STATES PATENT OFFICE 2,304,461

INJECTION MOLDING APPARATUS

Edward R. Knowles, Roselle, N. J., assignor to The Watson-Stillman Co., Roselle, N. J., a corporation of New Jersey Application December 4, 1940, Serial No. 368,437

5 Claims. (Cl. 18—30)

In the molding of an article of annular form, such as an automobile steering wheel, for example, from thermoplastic material it is customary to inject the material in a heated plastic state into an annular mold cavity at a plurality of points spaced around the cavity. When so injected the material flows in separate streams within the cavity and the streams unite and weld together end-to-end. Frequently the welds so formed are so imperfect as to necessitate discarding of the molded article. Flaws in the welds are caused by the presence of air in the mold cavity. As the streams are advanced toward each other by the injection force they compress the air so that it is forced into the material and causes bubbles or blow holes in the welds. In addition to that, the air conducts heat from the material thereby reducing its plasticity at the ends of the streams where plasticity is most needed for the welding. The air also resists charging of the mold cavity to some degree and the resistance increases as the streams approach each other and compress the air. Another cause of imperfections in such molding is the practice of employing separate injection devices for injection at the different points around the mold cavity. It is difficult and sometimes impossible to obtain thermal equality and consequently equality in plasticity in the material from the different injectors.

An important object of the present invention is to provide an improved injection molding apparatus devised to eliminate the disadvantages just mentioned and provide for perfect welding and accurate forming of the molded product. Other objects of the invention will appear hereinafter.

In the drawings,

Fig. 1 is a sectional elevation of an injection molding machine of improved design for practicing the improved method;

Fig. 2 is an enlarged horizontal section on the line 2—2 of Fig. 1;

Fig. 3 is a diagrammatic view of the mold cavity, the connections for charging the cavity and the means for evacuating air from the cavity;

Fig. 4 is an enlarged vertical sectional view of the molding dies of the machine in mold-closing relation and a portion of the injection device for charging the mold cavity, a skeleton steering wheel being shown between the dies;

Fig. 5 is a plan view of one of said dies upon a smaller scale than Fig. 5 and with the skeleton wheel supported thereon;

Fig. 6 is an enlarged detail section on the line 6—6 of Fig. 5;

Fig. 7 is an enlarged detail section on the line 7—7 of Fig. 4; and

Fig. 8 is an enlarged detail section on the line 7—7 of Fig. 4.

The injection molding machine includes upper and lower hydraulic cylinders 1 and 2 respectively, arranged in vertical alinement and connected by strain rods 3. The strain rods are screwthreaded and have nuts 4 screwed thereon to hold the cylinders in a spaced relation along the rods. Between said cylinders there is a rigid cross plate 5 adjustably secured in a definite position along the strain rods by threaded spacer sleeves 6 and nuts 7 screwed upon the rods below and above said plate respectively. A die-supporting platen 8 is located between said plate and the lower cylinder and mounted to reciprocate vertically toward and from the lower ends of the sleeves 6. Normally the platen rests upon threaded collars 9 adjustably screwed upon the strain rods. The cylinder 1 has a ram 10 reciprocable through its lower end and comprising part of an injection device. Hydraulic connections 11 and 12 lead to the upper and lower ends of said cylinder. Cylinder 2 has a ram 13 reciprocable through the upper end of the cylinder, and the cylinder has hydraulic connections 14 and 15 leading to its lower and upper ends respectively. The means for controlling hydraulic pressure in the cylinders for reciprocation of the rams form no part of the present invention and illustration of such means is therefore omitted.

Plate 5 has a vertical bore 16 in axial alinement with ram 10. A vertical injection cylinder 17 has an upper end portion thereof fitted and secured within said bore. The said cylinder has a screw-threaded upper end screwed into a plate 18 bolted to the upper surface of plate 5. The injection cylinder has a bore 19 to receive an injection charge of thermoplastic material, and the cylinder is surrounded by electrical heating means 20 to heat and plasticize the charge. A nozzle element 21 is screwed into the lower end of the injection cylinder and has a downwardly tapering outlet port 22. Within the cylinder bore there is a torpedo 23 to spread the charge into contact with the heated wall of the bore. An injection plunger 24 is mounted upon the lower end of the ram 10 and is advanceable by the latter into the bore 19 to extrude the charge. The plate 18 provides a stop for the ram 10 to limit advance of the plunger into the injection cylinder.

A charge distributor is mounted upon the lower end of the injector. It comprises a disk-like body 25 detachably secured to the under side of the nozzle element 21 by bolts 26. Said body has a central inlet bore 27 and branch bores 28 radiating from said inlet bore and closed by plugs 29 at their outer ends. The inlet bore is in register with the nozzle port 22 to receive the ejected charge directly therefrom. A vertical bore 30 leads downward from each branch bore 28 and has a screw-threaded counterbore opening through the under face of the distributor body. A threaded injector nozzle 31 is screwed into each counterbore. The lower ends of the injector nozzles 31 are flat and all in the same horizontal plane. An ejected charge is distributed through the said branch bores and ejected through the nozzles 31 into a plurality of mold gates. The distributor body also has radial bores 32 extending inward from its outer edge and located between said branch bores. These bores 32 contain electrical heating elements 33 of cartridge form, for heating the distributor body and thereby heating the thermoplastic material in the branch bores 28.

A sectional mold is formed by companion upper and lower dies D and D' respectively. The upper die is detachably bolted to the under side of the platen 8, and the lower die is detachably bolted to the upper end of the ram 13. At their opposed faces said dies are formed to define together an annular mold cavity 34 and also define extensions 35 of said cavity projecting radially inward. As shown in Figs. 4 and 5, a skeleton steering wheel is disposed between the dies and includes a hub H, spokes S and a rim R, all of metal. The opposed faces of the dies are centrally recessed, as at 36 and 37, to provide clearance for the hub. Between the central recesses and the mold cavity extensions 37 said die faces are grooved to receive the spokes and hold the wheel in a position with its rim centered within the annular mold cavity. Said die faces are also formed with opposed recesses 38 located between the cavity extensions 35 and the central recesses. Blocks 39 of rubber or other suitable compressible material are fitted in said recesses 38 and are formed to fit around the spokes and be under compression when the mold is closed. The purpose of these blocks is to seal the spoke-receiving grooves of the dies against admission of air along the spokes to the mold cavity, for a purpose which will appear hereinafter.

Die D has a plurality of vertical bores 40 in alinement with the injection nozzles 31 and each counterbored at its upper end. A bushing 41 is fitted in each of said bores and has an enlarged head fitted in the counterbore and with a flat boss 42 at its upper side. The bushing has an upwardly tapering bore. Die D' has a plurality of bores 43 in alinement with the bores 40 and each counterbored at its upper end. A bushing 44 is fitted in the counterbore of each bore 44 and in turn has at its upper end an upwardly tapering counterbore 45. When the dies are brought together to close the mold each bushing 44 abuts one of the bushings 41 endwise. The dies are grooved and said abutting bushings are notched to define mold-charging passages or gates 46. One of these gates leads from each pair of abutting bushings to the annular mold cavity 34 for injection into the cavity at points equally spaced therearound. Die D' also has a central bore 47 counterbored at its upper end and with a bushing 48 fitted in its counterbore. A knockout pin 49 is slidably fitted in the bore of bushing 48 to engage the hub H of the steering wheel. At its upper end said pin is reduced to fit into the bore of the hub and holds the wheel laterally centered. Other knock-out pins 50 are slidably fitted in the bushings 44. Each die has passages 51 for circulation of hot oil or other fluid for heating the dies.

At points equally spaced around the annular mold cavity 34 and located midway between the mold gates 46 the upper face of die D' is formed with narrow, shallow depressions 52. When the dies abut each other these depressions form air exhaust ports. These ports may be, for example, only one one-hundredth of an inch in depth and one-half inch in width. These ports open from the annular mold cavity directly into shallow air chambers located outwardly of the ports. These chambers are defined by depressions 53 in the opposed faces of the dies. From each pipe a passage 54 leads downward through the die D' and laterally outward, and a suction pipe 55 is connected to its outer end. All of these pipes are connected to a pipe 56 leading to a vacuum tank 57. A suction pump 57a is connected to said tank to exhaust the air therefrom and a valve V is operable to open and close pipe 56. For accurately truing the injection nozzles 31 with relation to the mold inlet bushings 41 the die D rigidly bears upwardly projecting dowel pins 58 tapered at their upper ends and adapted to enter vertical bores 59 in the charge distributor body 25. In order to accurately true the dies with relation to each other the lower die D' rigidly bears dowel pins 60 tapered at their upper ends and adapted to enter vertical bores in the upper die D.

According to my method of injection molding the molding material is plasticized in a single heated chamber. The plasticized material is ejected from said chamber and forced through heated passages to a plurality of mold gates spaced apart around the mold cavity, and, under the force of the ejection from said chamber, the material flows through said gates to charge the mold. Prior to ejection of the charge from said chamber air is evacuated from the said heated passages, the mold gates and the mold cavity by suction at points spaced around the cavity and located intermediate the mold gates. The suction at these points is continued throughout the mold-charging operation. The removal of the air from the path of the material as the latter is quickly advanced by the ejection force reduces resistance to such advance, prevents conduction of heat away from the material by air and prevents air from being forced into the material and causing bubbles therein which weaken the casting. When the material enters the mold cavity through the spaced gates it splits into streams within the cavity and the streams flow toward each other and meet at, or substantially at, the points at which the air is sucked from the cavity. At these points the streams weld together end-to-end to form the complete annular casting.

The bringing of the material to all of the mold gates from a common heating chamber and the maintenance of the material in a properly heated condition as it flows from said chamber to the different gates contributes materially to uniform and proper heating of the streams of material so that they will be in proper thermal condition for molding. The air evacuation helps to maintain this condition by eliminating loss of heat by air conduction. The air evacuation also prevents compression of air between the advancing streams and enables the streams to meet and weld together without the occurrence of blow holes. Under the molding conditions described the material in the finished molded product will be rendered as dense and strong at the welds as in other parts of the molded product.

The machine is operated as follows to perform the method: The lower die D', bearing the skeleton wheel is advanced upward by hydraulic pressure in the cylinder 2 until die D' abuts the die D, carries the latter and the platen 8 upward with it and brings the bushings 40 of the upper die into endwise sealing contact with the injection nozzles 31. The platen 8 has a central opening 61 affording clearance for the distributor 25 and enabling the die D to effect its sealed connection therewith. Said upward movement is positively limited by contact of the platen 8 with the sleeves 6. A charge of thermoplastic material having been placed in the injection cylinder and plasticized by heat, the ram 10 and injection plunger 24 are forced downward by hydraulic pressure in the cylinder 1 to eject the charge from the injection cylinder. The ejected charge is forced quickly through the nozzle port 21, the distributor passages 28 which are equally heated, the nozzles 31, the bores of the bushings 41, the mold gates 46 and into the annular mold cavity to charge the latter and its extensions 35. From the time the bosses 42 at the upper ends of the bushings 41 seal against the nozzles 31 the suction is effective to exhaust air from the distributor passage 28, the nozzles 31, the bores of the bushings 41, the mold gates 46 and the mold cavity, through the exhaust ports 52 and the air chambers into which said ports open. When the material charged into the mold cavity reaches said ports it seals them.

After completion of the molding operation the ram 10 and the injection plunger are raised by hydraulic pressure and the ram and die D' are lowered. Die D follows D' downward until the platen 8 rests upon the collars 9. Then, continued lowering of the die D' opens the mold. As the dies separate, the lower die retains the molded article by reason of the fact that the material becomes molded into the upwardly tapered recesses at the upper ends of the bushings 44. Thereby dove-tail connections are made between the lower die and the material in the mold gates to hold the molded product to said die. When die D' has receded from die D far enough to withdraw the material which has been molded in the tapered bores of the bushings 41 of the upper die the downward movement of the knock-out pins 49 and 50 is arrested by a usual means. Then, continued downward movement of the die D' will cause the knock-out pins to free the molded product from the die. Material which has entered the air exhaust ports and possibly the air chambers will be in one piece with the molded product and will be ejected with it.

What I claim is:

1. In an injection molding machine including a charge container, means for heating and plasticizing a charge of molding material in said container, a plunger to expel the charge from the container, a charge-distributing means having a plurality of passages to receive the expelled charge and conduct it away from the container in a plurality of streams and means for heating said passages, the improvement which comprises a mold comprising opposed companion molding dies formed to define an annular mold cavity for molding a wheel rim and formed to receive therebetween wheel spokes and support the latter in a position to hold an annular rim reinforcement attached to the spokes in a position in said cavity to have said material molded around it, one of said dies having passages to receive said streams from said distributor passages respectively and leading to said cavity at points spaced circumferentially around the cavity to charge the latter, the mold having a plurality of air exhaust ports spaced circumferentially around said cavity and located midway between said charging points, suction means connected to said ports to evacuate air from said cavity, said die passages and said distributor passages, and sealing means of compressible material borne by said dies to embrace said spokes transversely and prevent admission of air along the spokes to said cavity.

2. In an injection molding machine, a mold comprising opposed companion molding dies together formed to define an annular mold cavity for molding a wheel rim and formed to receive therebetween wheel spokes and support the latter in a position to hold an annular rim reinforcement attached to the spokes in a position in said cavity to have material molded around it, one of said dies having passages to conduct streams of said material to said cavity at points spaced circumferentially around the cavity to charge the latter, the mold having a plurality of air exhaust ports spaced circumferentially around said cavity and located midway between said charging points, suction means connected to said ports to evacuate air from said cavity, said die passages and said distributor passages, and sealing means of compressible material borne by said dies to embrace said spokes transversely and prevent admission of air along the spokes to said cavity.

3. In an injection molding machine, a mold comprising opposed separable companion molding dies formed to together define an annular mold cavity for molding a wheel rim and formed to receive therebetween wheel spokes and support the latter in a position to hold an annular rim reinforcement in a position in said cavity to have material molded around it, one of said dies having passages to conduct streams of said material to said cavity at points spaced circumferentially around the cavity to charge the cavity, said dies being formed at their meeting faces to define air exhaust ports for said cavity at points spaced circumferentially around the cavity and located midway between said charging points, the dies being also formed at their meeting faces to define air chambers into which said exhaust ports open, suction means connected to said air chambers to exhaust air from said cavity through the ports and chambers, and sealing means of compressible material borne by said dies to embrace said spokes transversely and prevent admission of air along the spokes to said cavity.

4. In an injection molding machine, a mold comprising opposed separable companion molding dies formed to together define an annular mold cavity, one of said dies having passages to conduct streams of said material to said cavity at points spaced circumferentially around the cavity to charge the cavity, said dies being formed at their meeting faces to define air exhaust ports for said cavity at points spaced circumferentially around the cavity and located midway between said charging points, the dies being also formed at their meeting faces to define air exhaust chambers into which said exhaust ports open, and suction means connected to said chambers to exhaust air from said cavity through the ports and chambers.

5. In an injection molding machine, a mold comprising opposed separable companion molding dies together formed to define an annular mold cavity for molding a wheel rim and formed to receive therebetween wheel spokes and support the latter to hold an annular rim reinforcement in a position in said cavity to have material molded around said reinforcement, one of said dies having passages to conduct streams of said material to said annular cavity at points spaced around the circumference of the cavity to charge the cavity, the mold having a plurality of air-exhaust ports for said cavity spaced around the circumference of the cavity and located intermediate said charging points, suction means connected to said ports to evacuate air from said cavity, said dies having opposed recesses at their opposed faces and located radially inward of said cavity, and opposed sealing blocks of compressible and resilient material borne by the dies respectively and seated within said recesses and normally projecting from the opposed faces of the dies, for embracing said spokes transversely by compression therearound when the dies are closed, to prevent admission of air along the spokes to said cavity.

EDWARD R. KNOWLES.